3,736,250
CATALYTIC HYDROGENATION USING KCl-ZnCl$_2$ MOLTEN SALT MIXTURE AS A CATALYST

Lloyd Berg, Bozeman, Mont., and John S. Malsam, St. Paul, Minn., assignors to the United States of America as represented by the Secretary of the Interior
No Drawing. Filed Nov. 17, 1971, Ser. No. 199,764
Int. Cl. C10g *13/08, 29/12*
U.S. Cl. 208—10                          6 Claims

ABSTRACT OF THE DISCLOSURE

KCl is incorporated with molten ZnCl$_2$ catalyst in a coal or coal extract hydrocracking zone so that any reaction product and unreacted feedstock entrained in the catalyst can be separated from spent catalyst in a simple gravity separation vessel.

---

It is well known that molten zinc chloride is a very effective hydrogenation catalyst for hydrocracking polynuclear aromatic hydrocarbonaceous feedstocks such as pyrene, coal and coal extract.

The major drawback in the use of the zinc chloride is that nitrogen and sulfur in the feedstock react with the salt and poison its activity; and a regenerative step is necessary. Such a step is complicated by the fact that there is no appreciable phase separation between the spent salt and entrained constituents consisting of liquid hydrocarbon reaction products and unreacted feedstock. (The entrained constituents will hereinafter be referred to as the "hydrocarbon phase.") Thus, an extraction with water and an organic solvent is necessary to separate the spent salt from the hydrocarbon phase, as shown, for example, in U.S. Pat. No. 3,371,049 to Gorin et al. Such extraction procedures complicate and increase the costs of the overall process. For example, the added water subsequently must be evaporated from the spent salt before the salt can be regenerated and returned to the hydrocracking zone.

We have now discovered that the incorporation of KCl with the molten ZnCl$_2$ in a mole ratio of about 1:1 allows the lighter entrained hydrocarbon phase to readily separate out from the heavier spent molten salt phase so as to form two adjacent layers. Although the ZnCl$_2$ is "diluted" with KCl, high conversions of the feedstock are still attainable with the salt mixture.

It is therefore an object of the present invention to separate entrained hydrocarbon phase from spent molten zinc chloride hydrocracking catalyst.

Another object is to attain such separation without extraction solvents.

A still further object is to disengage these materials by gravity separation.

Other objects and advantages will be obvious from the following more detailed description of the invention.

In the practice of the present invention the polynuclear aromatic hydrocarbonaceous feedstock is contacted with the catalytic molten salt in the prior art manner such as passing the feedstock upwardly through a bath of the molten salt.

Potassium chloride is incorporated in the catalytic molten salt in a mole ratio of about 1:1. If more KCl is present, it significantly detracts from the catalytic effectiveness of the ZnCl$_2$. If substantially less KCl is present (e.g. 1:2 mole ratio of KCl to ZnCl$_2$) the hydrocarbon phase remains substantially entrained in the molten salt mixture.

Hydrocracking operating conditions (temperature, pressure, liquid hourly spaced velocity, H$_2$/feedstock ratio, ZnCl$_2$ catalyst) are generally the same as those in the prior art. Such conditions are disclosed in U.S. Pat. No. 3,371,049. However, to maintain at least an 80% conversion of the feedstock, the operating temperature is preferably at least 400° C., and the pressure is at least 2500 p.s.i.g. In addition, in order to maintain the prior art amount of ZnCl$_2$ in the hydrocracking zone, the total amount of molten salt will have to be proportionately higher since ZnCl$_2$ constitutes only part of the total salt composition. With regard to a coal feedstock, a total molten salt-to-coal weight ratio of about 4:1 is particularly effective, and results in feedstock conversions of over 90%.

During catalyst regeneration, the spent molten salt and entrained hydrocarbon phase from the catalytic hydrocracking zone are conveyed to a gravity settling zone or vessel to allow the heavier molten salt layer or phase to settle to the bottom. Thereafter, the molten salt is drawn from the vessel, and regenerated in the prior art manner as for example in the system shown in U.S. Pat. No. 3,371,049.

Optimum settling times in the gravity separation vessel are best determined experimentally with regard to each particular feedstock. In a coal or coal extract hydrocracking operation, a minimum retention time of about 35 minutes will usually be necessary for substantial separation. If it is desired to shorten the separation period, a centrifugal separation system could be employed.

Unreacted feedstock drawn off from the separation zone can be recycled to the hydrocracking zone.

The following example illustrates the effectiveness of the process of the present invention.

EXAMPLE

A 500 ml. Parr stainless steel reaction bomb, having an electric heater and motor-driven oscillating mechanism, was filled with 20 g. of coal and 80 g. of KCl and ZnCl$_2$ in a 1:1 mole ratio. The bomb was then pressurized with hydrogen to an initial pressure of 4000 p.s.i.g., and then heated to 450° C. for a period of one hour. At the end of the hour, the bomb was allowed to cool to room temperature. The solid material removed from the bomb was completely separated into two distinct layers, the layer layer being the KCl:ZnCl$_2$ salt mixture, the upper layer being a mixture of unreacted coal and tar-like reaction products. When the test was repeated employing essentially the same conditions and a molten salt consisting of ZnCl$_2$, there was no separation between the catalyst and hydrocarbon phase.

It is believed that the ability of the molten salt to separate from the hydrocarbon phase is related to the viscosity of the molten salt. Molten ZnCl$_2$ is very viscous apparently due to a complex formed between ZnCl$_2$ molecules in the molten state. At a KCl:ZnCl$_2$ mole ratio of about 1:1, this complex appears to be completely broken down, and the salt is much less viscous. When employing this less viscous salt in a hydrocracking-regeneration system, an essentially complete phase separation can be achieved between the salt and the entrained hydrocarbon phase while still maintaining high catalytic activity.

We claim:

1. In a process comprising (a) catalytically hydrocracking coal with molten zinc chloride in a hydrocracking zone, (b) removing a combined stream of spent molten catalyst and entrained hydrocarbon phase from said hydrocracking zone, (c) separating said spent catalyst from said hydrocarbon phase, and (d) regenerating said separated catalyst, the improvement comprising
incorporating KCl with said molten catalyst in step (a) so that said molten catalyst includes KCl and $ZnCl_2$ in a mole ratio of about 1:1;
wherein separation step (c) consists essentially of separating said combined stream into light and heavy adjacent layers, said heavy layer consisting essentially of said spent molten catalyst, and said light layer consisting essentially of said hydrocarbon phase;
separating out said spent molten catalyst layer from said light layer; and
passing said separated-out molten catalyst through said regeneration step (d).

2. The process of claim 1 wherein said separation step comprises passing said combined stream to a gravity separation zone in which said spent molten catalyst sinks to the bottom of said gravity zone.

3. The process of claim 2 wherein said combined stream is retained in said gravity separation zone at least 35 minutes.

4. The process of claim 1 wherein said hydrocracking zone is operated at a pressure of at least 2500 p.s.i.g. and a temperature of at least 400° C.

5. The process of claim 2 wherein said hydrocracking zone is operated at a pressure of at least 2500 p.s.i.g. and a temperature of at least 400° C.

6. The process of claim 1 wherein the molten salt-to-feedstock weight ratio is about 4:1.

References Cited

UNITED STATES PATENTS

| | | | |
|---|---|---|---|
| 3,677,932 | 7/1972 | Hardesty et al. | 208—108 |
| 2,749,288 | 6/1956 | Watkins | 208—125 |
| 3,355,376 | 11/1967 | Gorin et al. | 208—10 |
| 3,371,049 | 2/1968 | Gorin et al. | 252—413 |
| 3,679,577 | 7/1972 | Wantland et al. | 208—108 |

DELBERT E. GANTZ, Primary Examiner

G. E. SCHMITKONS, Assistant Examiner

U.S. Cl. X.R.

208—108; 252—441